(12) United States Patent
Kamenoue

(10) Patent No.: US 11,242,462 B2
(45) Date of Patent: Feb. 8, 2022

(54) METHOD FOR PRODUCING POLYMER EMULSION FOR WATER-RESISTANT COATING FILM

(71) Applicant: KAO CORPORATION, Tokyo (JP)

(72) Inventor: Shogo Kamenoue, Wakayama (JP)

(73) Assignee: KAO CORPORATION, Tokyo (JP)

(*) Notice: Subject to any disclaimer, the term of this patent is extended or adjusted under 35 U.S.C. 154(b) by 129 days.

(21) Appl. No.: 16/468,814

(22) PCT Filed: Nov. 24, 2017

(86) PCT No.: PCT/JP2017/042226
§ 371 (c)(1),
(2) Date: Jun. 12, 2019

(87) PCT Pub. No.: WO2018/110246
PCT Pub. Date: Jun. 21, 2018

(65) Prior Publication Data
US 2019/0300721 A1  Oct. 3, 2019

(30) Foreign Application Priority Data

Dec. 14, 2016  (JP) .............................. JP2016-242615

(51) Int. Cl.
| | | |
|---|---|---|
| C08F 2/26 | (2006.01) | |
| C08F 20/06 | (2006.01) | |
| C08F 20/10 | (2006.01) | |
| C08F 112/00 | (2006.01) | |
| C09D 5/02 | (2006.01) | |
| C09D 7/65 | (2018.01) | |
| C09D 4/00 | (2006.01) | |
| C09D 201/00 | (2006.01) | |
| C09D 7/63 | (2018.01) | |
| C08F 220/14 | (2006.01) | |
| C08F 220/18 | (2006.01) | |

(52) U.S. Cl.
CPC ............... C09D 5/027 (2013.01); C09D 4/00 (2013.01); C09D 5/02 (2013.01); C09D 7/65 (2018.01); C09D 201/00 (2013.01); C08F 2/26 (2013.01); C08F 220/14 (2013.01); C08F 220/18 (2013.01); C09D 5/028 (2013.01); C09D 7/63 (2018.01)

(58) Field of Classification Search
CPC ....................................................... C08F 2/26
See application file for complete search history.

(56) References Cited

U.S. PATENT DOCUMENTS

| | | |
|---|---|---|
| 4,612,352 A | 9/1986 | Schafer et al. |
| 5,621,055 A | 4/1997 | Miyanaga et al. |
| 2004/0048963 A1 | 3/2004 | Sawada et al. |
| 2015/0329698 A1 | 11/2015 | Murata et al. |

FOREIGN PATENT DOCUMENTS

| | | | |
|---|---|---|---|
| CN | 1084179 A | | 3/1994 |
| EP | 2 508 560 A1 | | 10/2012 |
| JP | 57078936 A | * | 5/1982 |
| JP | 8-269245 A | | 10/1996 |
| JP | 10-67980 A | | 3/1998 |
| JP | 2001-72703 A | | 3/2001 |
| JP | 2002-302544 A | | 10/2002 |
| JP | 2003-342304 A | | 12/2003 |
| JP | 2003342304 A | * | 12/2003 |
| JP | 2004-98054 A | | 4/2004 |
| JP | 2004-137309 A | | 5/2004 |
| JP | 2005-206716 A | | 8/2005 |
| JP | 2007-254721 A | | 10/2007 |
| JP | 2009-138168 A | | 6/2009 |
| JP | 2014-1167 A | | 1/2014 |
| JP | 2015-98514 A | | 5/2015 |
| JP | 2016-124973 A | | 7/2016 |
| TW | I308790 B | | 4/2009 |
| WO | WO 2013/129489 A1 | | 9/2013 |

OTHER PUBLICATIONS

English translation of JP2004-098054.*
Computer-generated English-language translation of JP-57078936-A.*
Computer-generated English-language translation of JP-2003342304-A.*
Yeates et al., Makromol. Chem. 185, 1559-1563 (1984).*
International Search Report, issued in PCT/JP2017/042226, PCT/ISA/210, dated Feb. 13, 2018.
Extended European Search Report, dated June 8, 2020, for European Application No. 17881208.7.
European Patent Office Communication pursuant to Article 94(3) EPC issued in the corresponding European Patent Application No. 17881208.7 dated Dec. 16, 2021.

* cited by examiner

*Primary Examiner* — Vu A Nguyen
(74) *Attorney, Agent, or Firm* — Birch, Stewart, Kolasch & Birch, LLP

(57) ABSTRACT

The present invention relates to [1] a method of producing a polymer emulsion for water-resistant coating films with excellent water resistance, including emulsion polymerizing a radical polymerizable monomer (B) in the presence of a compound (A) represented by the following formula (1); and [2] a method of producing a polymer coating film, including a step 1 of emulsion polymerizing a radical polymerizable monomer (B) in the presence of a compound (A) represented by the following formula (1), to obtain a polymer emulsion having an average particle diameter of 30 nm or more and 300 nm or less, and a step 2 of applying the obtained polymer emulsion on a substrate and then drying:

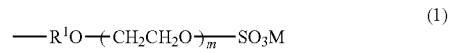

(1)

wherein $R^1$ represents an alkyl group having 16 or more and 24 or less carbon atoms; m represents an average addition molar number of $(CH_2H_2O)$ and is 0.5 or more and 10 or less; and M represents a cation or a hydrogen atom.

6 Claims, No Drawings

METHOD FOR PRODUCING POLYMER EMULSION FOR WATER-RESISTANT COATING FILM

FIELD OF THE INVENTION

The present invention relates to a method of producing a polymer emulsion for water-resistant coating films, a polymer emulsion for water-resistant coating films, a coating material composition containing the same, and a method of producing a polymer coating film.

BACKGROUND OF THE INVENTION

Hitherto, polymer emulsions obtained through emulsion polymerization of a vinyl monomer, such as an acrylic acid ester and styrene, are widely used as they are in the fields of a coating material, an adhesive, paper processing, fiber processing and so on. For the emulsion polymerization, anionic surfactants, such as an alkyl sulfuric acid ester salt and a polyoxyethylene alkyl ether sulfuric acid ester salt, and nonionic surfactants, such as a polyoxyethylene alkyl ether, are used as an emulsifier.

In a coating material, an adhesive and so on, each containing a polymer emulsion using such a surfactant, a polymer coating film is formed by means of drying of the polymer emulsion. However, it is known that since the emulsifier remains in the polymer coating film, lowering in water resistance, adhesiveness, weather resistance, heat resistance, or the like is caused.

For example, for an aqueous coating material, a polymer emulsion resulting from emulsion polymerization of a (meth)acrylic acid ester is frequently used. However, if the water resistance of this polymer coating film is poor, such a polymer emulsion cannot be used for an application in which the water resistance is required, such as a building outer wall and a bathroom wall. In addition, in production of a synthetic rubber or the like, on taking out the polymer from the polymer emulsion by means of salting-out or the like, there is involved such a problem that the emulsifier is contained in drainage, whereby a burden of the waste water treatment becomes large.

Then, at the time of production of a polymer emulsion, as those using an emulsifier suitable an application of the resulting polymer emulsion, there are proposed various surfactants for emulsion polymerization and production methods of a polymer emulsion.

As an emulsifier for emulsion polymerization which is low in influences on the environment, JP 2001-72703 A (PTL 1) discloses an emulsifier for emulsion polymerization having a polyalkyleneoxy group which is constituted through copolymerization of two or more alkylene oxides.

As a production method of a pressure sensitive adhesive sheet with excellent water resistance and having an adhesive layer which even when dipped in water, is hardly whitened, JP 2007-254721 A (PTL 2) discloses a production method including a step of applying an emulsion type adhesive obtained through polymerization of an emulsion containing a radical polymerizable monomer containing an alkyl (meth) acrylate as a main component, a surfactant and so on, drying, and then fusion bonding emulsion particles to form an adhesive layer.

JP 2009-138168 A (PTL 3) discloses a production method of a polymer emulsion including emulsion polymerizing a radical polymerizable monomer in the presence of a surfactant composition for emulsion polymerization containing an alkyl ether sulfuric acid ester salt in which a propyleneoxy group and an ethyleneoxy group are block-added.

JP 2016-124973 A (PTL 4) discloses a production method of a surfactant composition including compounding (A) a polyol having 2 to 3 carbon atoms, (B) a specified polyoxyalkylene alkyl or alkenyl ether sulfuric acid ester or a salt thereof, and (C) at least one selected from alkali metal salts, with water.

SUMMARY OF THE INVENTION

The present invention relates to a method of producing a polymer emulsion for water-resistant coating films, including emulsion polymerizing a radical polymerizable monomer (B) in the presence of a compound (A) represented by the following formula (1):

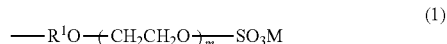

wherein $R^1$ represents an alkyl group having 16 or more and 24 or less carbon atoms; m represents an average addition molar number of $(CH_2H_2O)$ and is 0.5 or more and 10 or less; and M represents a cation or a hydrogen atom.

DETAILED DESCRIPTION OF THE INVENTION

In the techniques described in the aforementioned patent literatures, since it may not be said that a surface active performance of the emulsifier is sufficient, a particle diameter of the polymer emulsion becomes large. Furthermore, there is involved such a problem that on forming this polymer emulsion into a polymer coating film, the polymer coating film absorbs moisture owing to the emulsifier remaining in the polymer coating film, so that the water resistance of the polymer coating film is lowered.

Under such circumstances, it is demanded to develop a polymer emulsion suitable for water-resistant coating films, a coating material composition, and a polymer coating film.

The present invention is concerned with a method of producing a polymer emulsion for water-resistant coating films with excellent water resistance, a polymer emulsion for water-resistant coating films, a coating material composition containing the same, and a method of producing a polymer coating film.

The present inventors have found that a polymer emulsion with excellent water resistance can be produced through emulsion polymerization of a radical polymerizable monomer in the presence of a polyoxyethylene alkyl ether sulfuric acid ester or a salt thereof having a specified structure, and it is able to solve the aforementioned problem.

Specifically, the present invention relates to the following [1] to [4].

[1] A method of producing a polymer emulsion for water-resistant coating films, including emulsion polymerizing a radical polymerizable monomer (B) in the presence of a compound (A) represented by the following formula (1):

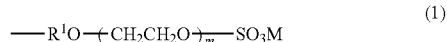

wherein $R^1$ represents an alkyl group having 16 or more and 24 or less carbon atoms; m represents an average addition molar number of (CH$_2$H$_2$O) and is 0.5 or more and 10 or less; and M represents a cation or a hydrogen atom.

[2] A polymer emulsion for water-resistant coating films, which is obtained by the method as set forth in the above [1].

[3] A coating material composition containing the polymer emulsion as set forth in the above [2].

[4] A method of producing a polymer coating film, including the following steps 1 and 2:

Step 1: a step of emulsion polymerizing a radical polymerizable monomer (B) in the presence of a compound (A) represented by the foregoing formula (1), to obtain a polymer emulsion having an average particle diameter of 30 nm or more and 300 nm or less; and Step 2: a step of applying the polymer emulsion obtained in the step 1 on a substrate and then drying.

In accordance with the present invention, it is possible to provide a method of producing a polymer emulsion for water-resistant coating films with excellent water resistance, a polymer emulsion for water-resistant coating films, a coating material composition containing the same, and a method of producing a polymer coating film.

[Production Method of Polymer Emulsion for Water-Resistant Coating Films]

The production method of a polymer emulsion for water-resistant coating films of the present invention is a method of emulsion polymerizing a radical polymerizable monomer (B) (hereinafter also referred to simply as "monomer (B)") in the presence of a compound (A) represented by the following formula (1) (hereinafter also referred to simply as "compound (A)").

(1)

In the formula, R$^1$ represents an alkyl group having 16 or more and 24 or less carbon atoms; m represents an average addition molar number of (CH$_2$H$_2$O) and is 0.5 or more and 10 or less; and M represents a cation or a hydrogen atom.

In this specification, the "coating film" means a film in a state that the polymer emulsion is applied on a substrate and then dried for curing, and the "water-resistant coating film" means a coating film having water resistance.

The wording "having water resistance" does not mean one of evaluating the presence or absence of swelling or peeling in a state that the coating film is merely dipped in water but means the matter that as described in the section of Examples, after the coating film is allowed to stand and dipped in water for 20 days, its haze value is measured, and as a result, the haze value is 10% or less, preferably 8% or less, and more preferably 5% or less.

The polymer coating film obtained by the method of the present invention is excellent in water resistance and can be preferably used in the field of a coating material, particularly an aqueous coating material, or in the field of a pressure sensitive adhesive, and its application is expected to be much more expanded.

In accordance with the present invention, it is possible to produce a polymer emulsion for water-resistant coating films with excellent water resistance and a polymer coating film. Although the reasons for this are not elucidated yet, the following may be considered.

That is, in the production method of a polymer emulsion of the present invention, though the emulsion polymerization is performed in the presence of the compound (A) represented by the formula (1), in view of the fact that the compound (A) has a high surface active performance, in the emulsion polymerization, it is possible to micronize the particle diameter of the polymer emulsion, and the polymer coating film prepared by using this polymer emulsion becomes a minute film, and therefore, it may be considered that the polymer coating film becomes excellent in water resistance.

General emulsifiers have a low melting point of lower than 0° C., are liable to move within the polymer coating film, and bleed into a surface of the coating film with time, thereby likely bringing water into the coating film. On the other hand, in view of the fact that the compound (A) has a melting point of preferably 0° C. or higher, more preferably 10° C. or higher, and still more preferably 20° C. or higher, it hardly moves within the polymer coating film, and even when allowed to stand for a long period of time, it does not bleed into a surface of the coating film; and therefore, even when placed in an environment of being exposed to water, it hardly brings water into the polymer coating film, and thus, it may be considered that the polymer coating film is excellent in water resistance.

<Compound (A)>

The compound (A) is a polyoxyethylene alkyl ether sulfuric acid ester or a salt thereof represented by the following formula (1).

The compound (A) may contain either one of a polyoxyethylene alkyl ether sulfuric acid ester and a polyoxyethylene alkyl ether sulfuric acid ester salt, represented by the formula (1), and may also contain two or more thereof.

(1)

In the formula, R$^1$ represents an alkyl group having 16 or more and 24 or less carbon atoms; m represents an average addition molar number of (CH$_2$H$_2$O) and is 0.5 or more and 10 or less; and M represents a cation or a hydrogen atom.

Although the alkyl group represented by R$^1$ in the formula (1) may be either linear or branched, from the viewpoints of micronizing the particle diameter of the polymer emulsion and improving the water resistance of a polymer coating film prepared by using this polymer emulsion, the alkyl group is preferably linear.

From the same viewpoints as those mentioned above, the carbon number of the alkyl group is 16 or more, preferably 18 or more, and more preferably 20 or more, and it is 24 or less, and preferably 22 or less. That is, the carbon number of the alkyl group is preferably 16 or more and 22 or less, more preferably 18 or more and 22 or less, and still more preferably 20 or more and 22 or less.

Specific examples of R$^1$ include alkyl groups, such as a palmityl group, a margaryl group, an isostearyl group, a 2-heptylundecyl group, a stearyl group, an arachidyl group, a behenyl group, and a lignoceryl group, and from the same viewpoints as those mentioned above, at least one selected from a palmityl group, a stearyl group, and a behenyl group is preferred, and a behenyl group is more preferred.

m in the formula (1) represents an average addition molar number of (CH$_2$CH$_2$O), and from the viewpoints of micronizing the particle diameter of the polymer emulsion and improving the water resistance of a polymer coating film prepared by using this polymer emulsion, m is 0.5 or more, preferably 1 or more, and more preferably 2 or more, and it is 10 or less, preferably 8 or less, more preferably 7 or less, still more preferably 6 or less, yet still more preferably 5 or less, and even yet still more preferably 4 or less. That is, m is 0.5 or more and 10 or less, preferably 1 or more and 8 or less, more preferably 2 or more and 7 or less, still more preferably 3 or more and 7 or less, and yet still more preferably 4 or more and 7 or less.

There is a case where m has a distribution, and plural compounds having a different average addition molar number of (CH$_2$CH$_2$O) from each other can be contained as the compound (A). The average addition molar number m can be, for example, measured by the method described in the section of Examples.

M in the formula (1) represents a cation or a hydrogen atom.

In the case where M is a cation, the compound represented by the formula (1) becomes a polyoxyethylene alkyl ether sulfuric acid ester salt. In this case, the compound represented by the formula (1) is strictly represented by the following formula (1-1).

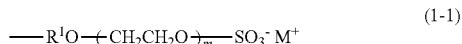

(1-1)

In the formula (1-1), R$^1$ and m are synonymous with R$^1$ and m in the formula (1), and preferred ranges thereof are also the same. M$^+$ represents a cation.

Examples of the cation as M include alkali metal ions, such as a lithium ion, a sodium ion, and a potassium ion; alkaline earth metal ions, such as a calcium ion; an ammonium ion; and alkanolammonium ions, such as a triethanolammonium ion. Of these, from the viewpoints of micronizing the particle diameter of the polymer emulsion and improving the water resistance of a polymer coating film prepared by using this polymer emulsion, M is preferably at least one selected from an alkali metal ion and an alkanolammonium ion, more preferably an alkali metal ion, still more preferably at least one selected from a sodium ion (Na$^+$) and a potassium ion (K$^+$), and yet still more preferably a sodium ion (Na$^+$).

In the case where M is a divalent or higher-valent cation, M may be present such that it becomes a counter ion to the anion —SO$_3$—, and for example, when M is a divalent cation, it may be present in an amount of ½ relative to the amount of —SO$_3$—.

In the case where M in the formula (1) is a hydrogen atom, the compound represented by the formula (1) becomes a polyoxyethylene alkyl ether sulfuric acid ester.

From the viewpoint of improving the water resistance of a polymer coating film, a melting point of the compound (A) is preferably 0° C. or higher, more preferably 10° C. or higher, and still more preferably 20° C. or higher, and from the viewpoint of workability in the polymer emulsion production, it is preferably 100° C. or lower, more preferably 90° C. or lower, and still more preferably 80° C. or lower.

In the case of using two or more compounds as the compound (A), it is preferred to allow the melting point of the compound (A) to fall within the aforementioned range in terms of a weighted average value as weighted by the contents (% by mass) of the plural compounds having a different melting point from each other.

In one embodiment of the present invention, it is preferred to use the compound (A) in which R$^1$ is a linear alkyl group having 18 or more and 22 or less carbon atoms, m is 1 or more and 8 or less, and M is a sodium ion or a potassium ion.

It is more preferred to use the compound (A) in which R$^1$ is a linear alkyl group having 20 or more and 22 or less carbon atoms, m is 2 or more and 7 or less, and M is a sodium ion or a potassium ion; and it is still more preferred to use the compound (A) in which R$^1$ is a linear alkyl group having 20 or more and 22 or less carbon atoms, m is 3 or more and 6 or less, and M is a sodium ion or a potassium ion.

As specific examples of the compound (A), at least one selected from C$_{18}$H$_{37}$O—(CH$_2$CH$_2$O)$_3$—SO$_3$Na, C$_{18}$H$_{37}$O—(CH$_2$CH$_2$O)$_3$—SO$_3$K, C$_{22}$H$_{45}$O—(CH$_2$CH$_2$O)$_4$—SO$_3$Na, and C$_{22}$H$_{45}$O—(CH$_2$CH$_2$O)$_4$—SO$_3$K is suitably exemplified.

The compound (A) can be used alone or in admixture of two or more thereof.

The compound (A) represented by the formula (1) can be obtained by subjecting an ethylene oxide compound represented by the following formula (2) to sulfation esterification with a sulfating agent and further neutralizing with a basic substance. Examples of the sulfating agent include sulfuric acid, sulfamic acid (amidosulfuric acid), sulfur trioxide, chlorosulfonic acid and so on, and from the viewpoint of suppressing a side reaction, sulfamic acid is preferred.

The sulfation reaction can be performed at a temperature of 60 to 140° C.

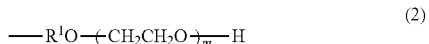

(2)

The ethylene oxide compound represented by the formula (2) can be synthesized by a known method. For example, the ethylene oxide compound represented by the formula (2) can be synthesized by a method of adding an alkylene oxide to a saturated alcohol having 18 or more and 22 or less carbon atoms in the presence of an alkaline catalyst, such as sodium hydroxide and potassium hydroxide, at a temperature of room temperature to 200° C. under atmospheric pressure or an elevated pressure.

<Radical Polymerizable Monomer (B)>

Specific examples of the radical polymerizable monomer (B) which is used in the present invention include aromatic vinyl monomers, such as styrene, α-methylstyrene, and chlorostyrene; (meth)acrylic acid; (meth)acrylic acid esters having an alkyl group having preferably 1 or more and 22 or less carbon atoms, more preferably 1 or more and 12 or less carbon atoms, and still more preferably having 1 or more and 8 or less carbon atoms, such as methyl (meth)acrylate, ethyl (meth)acrylate, butyl (meth)acrylate, and 2-ethylhexyl (meth)acrylate; vinyl halides, such as vinyl chloride and vinyl bromide; vinylidene halides, such as vinylidene chloride; vinyl esters, such as vinyl acetate and vinyl propionate; nitriles, such as (meth)acrylonitrile; and conjugated dienes, such as butadiene, isoprene and so on.

Such a monomer (B) may be subjected to homopolymerization, or a combination of two or more thereof may be subjected to copolymerization.

The (meth)acrylic acid means one or two selected from methacrylic acid and acrylic acid, and the (meth)acrylic acid ester means one or two selected from a methacrylic acid ester and an acrylic acid ester. The same is hereinafter applicable, too.

<Emulsion Polymerization>

The production method of a polymer emulsion of the present invention is a method of emulsion polymerizing the radical polymerizable monomer (B) in the presence of the compound (A) represented by the formula (1).

In the method of the present invention, other emulsifier than the compound (A) can be jointly used within a range where the effects of the present invention are not impaired. Examples of the other emulsifier include nonionic surfactants, such as an alcohol ethoxylate, an alkyl polyglycoside, and an alkanol amide; anionic surfactants, such as an alkyl sulfate, an alkyl ether sulfate, a fatty acid soap, and an alkyl ether carboxylate; water-soluble protective colloids and so on.

As a radical polymerization initiator which is used for the emulsion polymerization, all of materials which are used for typical emulsion polymerization can be used. Examples of the radical polymerization initiator include persulfates, such as potassium persulfate and ammonium persulfate; inorganic peroxides, such as hydrogen peroxide; organic peroxides, such as t-butyl hydroperoxide, benzoyl peroxide, cumene hydroperoxide, and p-menthane peroxide; and azo-based compounds, such as azobisdiisobutyronitrile, 2,2-azobis(2-amidinopropane) dihydrochloride and so on. From the viewpoints of polymerization reactivity, workability, and economy, persulfates are preferred. Furthermore, a redox-based initiator in which a peroxide compound is combined with a reducing agent, such as sodium sulfite, rongalite, and ascorbic acid can also be used as the polymerization initiator. In addition, sodium hydrogen sulfite, ammonium ferrous sulfate and so on can also be used as a polymerization promoter.

(Proportions of Respective Components)

From the viewpoints of micronization of the particle diameter of the polymer emulsion, polymerization stability, and water resistance of the coating film, the use amount of the radical polymerizable monomer (B) in the present invention is preferably 30% by mass or more, and more preferably 40% by mass or more, and it is preferably 70% by mass or less, and more preferably 60% by mass or less, relative to the entire system.

From the same viewpoints as those mentioned above, the use amount of the compound (A) is preferably 5% by mass or more, more preferably 10% by mass or more, and still more preferably 20% by mass or more, and it is 100% by mass or less, relative to the total amount of the emulsifier.

The use amount of the compound (A) is preferably 0.1 parts by mass or more, more preferably 0.5 parts by mass or more, and still more preferably 1 part by mass or more, and it is preferably 10 parts by mass or less, more preferably 5 parts by mass or less, and still more preferably 3 parts by mass or less, based on 100 parts by mass of the monomer (B).

(Emulsion Polymerization Condition)

In the emulsion polymerization, in the case of adding the monomer (B), though all of a monomer dropping method, a monomer batch charging method, and a pre-emulsion method can be adopted, a pre-emulsion method is preferred from the viewpoint of polymerization stability.

A dropping time of the pre-emulsion is preferably 1 hour or more and 8 hours or less, and an aging time is preferably 1 hour or more and 5 hours or less. Although a polymerization temperature is regulated by a decomposition temperature of the polymerization initiator, it is preferably 50° C. or higher and 90° C. or lower, and in particular, in the case of a persulfate, the polymerization temperature is preferably 70° C. or higher and 85° C. or lower.

[Polymer Emulsion for Water-Resistant Coating Films]

The polymer emulsion for water-resistant coating films of the present invention is obtained by the method of the present invention.

From the viewpoint of water resistance of the coating film, an average particle diameter of the polymer emulsion for water-resistant coating films obtained by the method of the present invention is preferably 300 nm or less, more preferably 250 nm or less, still more preferably 200 nm or less, and yet still more preferably 160 nm or less, and from the viewpoint of polymerization stability, it is preferably 30 nm or more, more preferably 50 nm or more, and still more preferably 80 nm or more.

The measurement of the average particle diameter of the polymer emulsion can be performed by the method described in the section of Examples.

From the viewpoint of workability, a viscosity of the polymer emulsion is preferably 10 mPa·s or more, more preferably 50 mPa·s or more, and still more preferably 100 mPa·s or more, and it is preferably 50,000 mPa·s or less, more preferably 10,000 mPa·s or less, and still more preferably 5,000 mPa·s or less. The measurement of the viscosity of the polymer emulsion can be performed by a generally adopted measurement method, such as a rotational viscometer method using a Brookfield type viscometer.

[Coating Material Composition]

In the coating material composition of the present invention, by containing the aforementioned polymer emulsion, the water resistance of the resulting coating film is improved.

The coating material composition can further contain a pigment and optionally, water, a viscosity controlling agent, an anti-foaming agent, an antioxidant, an ultraviolet absorber, and the like.

Examples of the pigment include extender pigments, such as talc, kaolin, calcium carbonate, and barium sulfate; coloring pigments, such as red iron oxide, carbon black, ultramarine blue, and yellow iron oxide; inorganic pigments, such as a white pigment, e.g., titanium dioxide and zinc oxide, and a pearly pigment, e.g., titanium mica and bismuth oxychloride; dyes as an organic synthetic pigment; and organic pigments. These pigments can be used alone or in combination of two or more thereof.

From the viewpoint of water resistance of the coating film, the content of the polymer emulsion in the coating material composition of the present invention is preferably 5% by mass or more, more preferably 10% by mass or more, and still more preferably 15% by mass or more, and it is preferably 90% by mass or less, more preferably 85% by mass or less, and still more preferably 80% by mass or less, as expressed in terms of a solid content relative to the total solid content in the coating material composition.

In the case where the coating material composition of the present invention contains a pigment, from the viewpoint of water resistance of the coating film, the content of the pigment in the coating material composition is preferably 5% by mass or more, more preferably 20% by mass or more, and still more preferably 30% by mass or more, and it is preferably 95% by mass or less, more preferably 80% by mass or less, and still more preferably 70% by mass or less, as expressed in terms of a solid content (PWC) relative to the total solid content in the coating material composition. The PWC is calculated according to following formula.

$$PWC = \{(\text{Solid content of pigment in coating material composition}) \div (\text{Total solid content in coating material composition})\} \times 100$$

[Production Method of Polymer Coating Film]

The production method of a polymer coating film (hereinafter also referred to simply as "coating film") of the present invention includes the following steps 1 and 2:

Step 1: a step of emulsion polymerizing the radical polymerizable monomer (B) in the presence of the compound (A) represented by the formula (1), to obtain a polymer emulsion having an average particle diameter of 30 nm or more and 300 nm or less; and Step 2: a step of applying the polymer emulsion obtained in the step 1 on a substrate and then drying.

The compound (A) and the monomer (B) to be used in the step 1 are those as mentioned above.

In the step 1, the addition amount (content) of the compound (A) is 0.1 parts by mass or more, preferably 0.2 parts by mass or more, and more preferably 0.5 parts by mass or more, and it is 10 parts by mass or less, preferably 8 parts by mass or less, more preferably 5 parts by mass or less, and still more preferably 3 parts by mass or less, in the polymer emulsion based on 100 parts by mass of the monomer (B).

In this way, a polymer emulsion having an average particle diameter of 30 nm or more, preferably 50 nm or more, and more preferably 80 nm or more, and having an average particle diameter of 300 nm or less, preferably 250 nm or less, more preferably 200 nm or less, and still more preferably 160 nm or less is obtained.

The step 2 is a step of applying the polymer emulsion obtained in the step 1 on a substrate and then drying.

The substrate to be used is not particularly limited, and examples thereof include substrates made of a glass, a metal (e.g., aluminum and stainless steel), a ceramic (e.g., an insulator and a tile), a heat-resistant polymer material and so on.

A method of applying the polymer emulsion obtained in the step 1 on a substrate is not particularly limited, and conventionally known coating apparatuses, such as roll coaters, e.g., a comma coater, a blade coater, and a gravure coater, a slot die coater, a lip coater, and a curtain coater, can be used.

Although the polymer emulsion is applied on the substrate and then dried, by heating in a drying step, it is able to shorten a drying time and to improve the hardness of the coating film to be formed.

From the viewpoints of productivity and uniformity of the coating film, a heating temperature is preferably 50° C. or higher, and more preferably 90° C. or higher, and it is preferably 200° C. or lower, and more preferably 150° C. or lower.

From the viewpoints of productivity and uniformity of the coating film, a heating time is preferably 10 seconds or more, more preferably 30 seconds or more, and still more preferably 1 minute or more, and it is preferably 1 hour or less, and more preferably 30 minutes or less.

Although a thickness of the coating film varies with an application and so on, from the viewpoints of productivity and water resistance of the coating film, the thickness of the coating film is preferably 40 μm or less, and more preferably 30 μm or less, and from the viewpoint of increasing the hardness, it is preferably 1 μm or more, and more preferably 2 μm or more.

The polymer coating film can be produced by suitably changing the monomer (B) and so on according to an application thereof.

For example, in a pressure sensitive adhesive application, a polymer emulsion having a low glass transition temperature (Tg) of a polymer of a 2-ethylhexyl acrylate, n-butyl acrylate, or the like is produced through emulsion polymerization using the compound (A); and a material obtained by optionally blending a thickener, a tackifier and so on in the resulting polymer emulsion is then applied onto a base material, such as a paper and a film, followed by hot-air drying to form a polymer coating film having a thickness of about 10 to 40 μm, whereby a pressure sensitive adhesive product with excellent water resistance and pressure sensitive adhesive performance can be obtained.

In a coating material application, a polymer emulsion containing a n-butyl acrylate/methyl methacrylate copolymer or the like, is produced through emulsion polymerization using the compound (A); and a material obtained by optionally blending a film-forming aid, a pigment and so on in the resulting polymer emulsion is then applied onto a building wall material and so on such that a dry film thickness is about 1 to 500 μm, and preferably 10 to 300 μm, followed by natural drying or hot-air drying, whereby a coating film with excellent water resistance can be obtained.

The polymer coating film obtained by the method of the present invention is excellent in water resistance and can be preferably used in the field of a coating material, particularly an aqueous coating material, or in the field of a pressure sensitive adhesive product.

With respect to the aforementioned embodiments, the present invention further discloses the following production methods of a polymer emulsion for water-resistant coating films, polymer emulsions for water-resistant coating films, coating material compositions containing the same, and production methods of a polymer coating film.

<1> A method of producing a polymer emulsion for water-resistant coating films, including emulsion polymerizing a radical polymerizable monomer (B) in the presence of a compound (A) represented by the following formula (1):

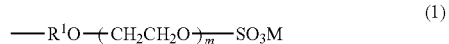

wherein $R^1$ represents an alkyl group having 16 or more and 24 or less carbon atoms; m represents an average addition molar number of $(CH_2H_2O)$ and is 0.5 or more and 10 or less; and M represents a cation or a hydrogen atom.

<2> The method of producing a polymer emulsion for water-resistant coating films as set forth in the above <1>, wherein the carbon number of the alkyl group represented by $R^1$ in the formula (1) is preferably 18 or more, and more preferably 20 or more, and it is preferably 22 or less.

<3> The method of producing a polymer emulsion for water-resistant coating films as set forth in the above <1> or <2>, wherein m in the formula (1) is preferably 1 or more, and more preferably 2 or more, and it is preferably 8 or less, more preferably 7 or less, still more preferably 6 or less, yet still more preferably 5 or less, and even yet still more preferably 4 or less.

<4> The method of producing a polymer emulsion for water-resistant coating films as set forth in any of the above <1> to <3>, wherein the compound (A) is preferably a compound in which $R^1$ is a linear alkyl group having 20 or more and 22 or less carbon atoms, m is 2 or more and 7 or less, and M is a sodium ion or a potassium ion; and more preferably a compound in which $R^1$ is a linear alkyl group having 20 or more and 22 or less carbon atoms, m is 3 or more and 6 or less, and M is a sodium ion or a potassium ion.

<5> The method of producing a polymer emulsion for water-resistant coating films as set forth in any of the above <1> to <4>, wherein a melting point of the compound (A) is preferably 0° C. or higher, more preferably 10° C. or higher, and still more preferably 20° C. or higher, and it is preferably 100° C. or lower, more preferably 90° C. or lower, and still more preferably 80° C. or lower.

<6> The method of producing a polymer emulsion for water-resistant coating films as set forth in any of the above <1> to <5>, wherein the compound (A) is at least one selected from $C_{18}H_{37}O-(CH_2CH_2O)_3-SO_3Na$, $C_{18}H_{37}O-(CH_2CH_2O)_3-SO_3K$, $C_{22}H_{45}O-(CH_2CH_2O)_1-SO_3Na$, and $C_{22}H_{45}O-(CH_2CH_2O)_4-SO_3K$.

<7> The method of producing a polymer emulsion for water-resistant coating films as set forth in any of the above <1> to <6>, wherein the radical polymerizable monomer (B) is at least one selected from aromatic vinyl monomers, (meth)acrylic acid esters having an alkyl group having 1 or more and 22 or less carbon atoms, preferably 1 or more and 12 or less carbon atoms, and more preferably having 1 or more and 8 or less carbon atoms, vinyl halides, vinylidene halides, vinyl esters, nitriles, and conjugated dienes; and preferably at least one selected from styrene, α-methylstyrene, chlorostyrene, (meth)acrylic acid, methyl (meth)acrylate, ethyl (meth)acrylate, butyl (meth)acrylate, 2-ethylhexyl (meth)acrylate, vinyl chloride, vinyl bromide, vinylidene chloride, vinyl acetate, vinyl propionate, (meth)acrylonitrile, butadiene, and isoprene.

<8> The method of producing a polymer emulsion for water-resistant coating films as set forth in any of the above <1> to <7>, wherein the use amount of the radical polymerizable monomer (B) is preferably 30% by mass or more, and more preferably 40% by mass or more, and it is preferably 70% by mass or less, and more preferably 60% by mass or less, relative to the entire system.

<9> The method of producing a polymer emulsion for water-resistant coating films as set forth in any of the above <1> to <8>, wherein the use amount of the compound (A) is preferably 5% by mass or more, more preferably 10% by mass or more, and still more preferably 20% by mass or more, and it is 100% by mass or less, relative to the total amount of the emulsifier.

<10> The method of producing a polymer emulsion for water-resistant coating films as set forth in any of the above <1> to <9>, wherein the use amount of the compound (A) is preferably 0.1 parts by mass or more, more preferably 0.5 parts by mass or more, and still more preferably 1 part by mass or more, and it is preferably 10 parts by mass or less, more preferably 5 parts by mass or less, and still more preferably 3 parts by mass or less, based on 100 parts by mass of the monomer (B).

<11> A polymer emulsion for water-resistant coating films, obtained by the method as set forth in any of the above <1> to <10>.

<12> The polymer emulsion for water-resistant coating films as set forth in the above <11>, wherein an average particle diameter of the polymer emulsion for water-resistant coating films is preferably 300 nm or less, more preferably 250 nm or less, still more preferably 200 nm or less, and yet still more preferably 160 nm or less, and it is preferably 30 nm or more, more preferably 50 nm or more, and still more preferably 80 nm or more.

<13> The polymer emulsion for water-resistant coating films as set forth in the above <11> or <12>, wherein a viscosity of the polymer emulsion is preferably 10 mPa·s or more, more preferably 50 mPa·s or more, and still more preferably 100 mPa·s or more, and it is preferably 50,000 mPa·s or less, more preferably 10,000 mPa·s or less, and still more preferably 5,000 mPa·s or less.

<14> A coating material composition containing the polymer emulsion as set forth in any of the above <11> to <13>.

<15> The coating material composition as set forth in the above <14>, wherein the content of the polymer emulsion in the coating material composition is preferably 5% by mass or more, more preferably 10% by mass or more, and still more preferably 15% by mass or more, and it is preferably 90% by mass or less, more preferably 85% by mass or less, and still more preferably 80% by mass or less, as expressed in terms of a solid content relative to the total solid content in the coating material composition.

<16> The coating material composition as set forth in the above <14> or <15>, wherein the content of a pigment in the coating material composition is preferably 5% by mass or more, more preferably 20% by mass or more, and still more preferably 30% by mass or more, and it is preferably 95% by mass or less, more preferably 80% by mass or less, and still more preferably 70% by mass or less, as expressed in terms of a solid content (PWC) relative to the total solid content in the coating material composition, as calculated according to the following formula:

PWC={(Solid content of pigment in coating material composition)÷(Total solid content in coating material composition)}×100

<17> A method of producing a polymer coating film, including the following steps 1 and 2:

Step 1: a step of emulsion polymerizing the radical polymerizable monomer (B) in the presence of the compound (A) represented by the foregoing formula (1), to obtain a polymer emulsion having an average particle diameter of 30 nm or more and 300 nm or less; and Step 2: a step of applying the polymer emulsion obtained in the step 1 on a substrate and then drying.

<18> The method of producing a polymer coating film as set forth in the above <17>, wherein in the step 1, the addition amount (content) of the compound (A) is 0.1 parts by mass or more, preferably 0.2 parts by mass or more, and more preferably 0.5 parts by mass or more, and it is 10 parts by mass or less, preferably 8 parts by mass or less, more preferably 5 parts by mass or less, and still more preferably 3 parts by mass or less, in the polymer emulsion based on 100 parts by mass of the monomer (B).

<19> The method of producing a polymer coating film as set forth in the above <17> or <18>, wherein an average particle diameter of the polymer emulsion is preferably 50 nm or more, and more preferably 80 nm or more, and it is preferably 250 nm or less, more preferably 200 nm or less, and still more preferably 160 nm or less.

<20> The method of producing a polymer coating film as set forth in any of the above <17> to <19>, wherein a heating temperature at the time of drying is preferably 50° C. or higher, and more preferably 90° C. or higher, and it is preferably 200° C. or lower, and more preferably 150° C. or lower; and a heating time is preferably 10 seconds or more, more preferably 30 seconds or more, and still more preferably 1 minute or more, and it is preferably 1 hour or less, and more preferably 30 minutes or less.

<21> The method of producing a polymer coating film as set forth in any of the above <17> to <20>, wherein the polymer emulsion is applied such that a thickness of the coating film is preferably 40 μm or less, and more preferably 30 μm or less, and it is preferably 1 μm or more, and more preferably 2 μm or more.

<22> A use of the compound (A) represented by the foregoing formula (1) for emulsion polymerization.

<23> A use of the polymer emulsion as set forth in any of the above <11> to <13> for a coating material.

EXAMPLES

Synthesis Example 1 (Synthesis of Compound 1)

An ethoxylate (average addition molar number of ethylene oxide: 4.0) of 1-Docosanol (manufactured by Tokyo Chemical Industry Co., Ltd.) was subjected to vacuum distillation at 250° C. and at 133.3 Pa to remove an unreacted alcohol, and the residue was subjected to a sulfation reaction with sulfamic acid (molar ratio of sulfamic acid to ethoxylate: 1.10) at a reaction temperature of 110° C.

256 g of the resulting polyoxyethylene behenyl ether sulfated product was neutralized with a 48% by mass sodium hydroxide aqueous solution and then heated at 80° C. under a nitrogen stream to undergo deammoniation, and the polyoxyethylene behenyl ether sulfate sodium salt concentration was controlled to 13% by mass with water, thereby synthesizing a polyoxyethylene behenyl ether sulfate sodium salt ($C_{22}H_{45}O$—$(CH_2CH_2O)_4$—$SO_3Na$: Compound 1).

Synthesis Examples 2 to 8 (Synthesis of Compounds 2 to 8)

Compounds 2 to 8 shown in Table 1 were synthesized in the same manner as in Synthesis Example 1.

<Calculation of Average Addition Molar Number (m) of Ethylene Oxide>

A hydroxyl value was determined by the method described in "JIS K 0070-1992 7.1: Neutralization titration method", and an average addition molar number (m) of ethylene oxide in each of Compounds 1 to 8 was calculated according to the following formula. The results are shown in Table 1.

Average addition molar number $(m) = (M_a \div OHV - M_b) \div M_c \times 1000$

OHV: Hydroxyl value (mgKOH/g) of the ethylene oxide compound represented by the formula (2)

$M_a$: Molecular weight of potassium hydroxide (56.1)

$M_b$: Molecular weight of the ethylene oxide compound represented by the formula (2)

$M_c$: Molecular weight of the ethylene oxide

An acid value to be used for calculation of the OHV (hydroxyl value) was determined by the method described in "JIS K 0070-1992 3.1: Neutralization titration method".

TABLE 1

| | $R^1$ in the formula (1) | | m | M |
| --- | --- | --- | --- | --- |
| Compound 1 | Behenyl group | Saturated C22 | 4 | $Na^+$ |
| Compound 2 | Stearyl group | Saturated C18 | 7 | $Na^+$ |
| Compound 3 | Palmityl group | Saturated C16 | 4 | $Na^+$ |
| Compound 4 | Stearyl group | Saturated C18 | 4 | $Na^+$ |
| Compound 5 | Lauryl group | Saturated C12 | 18 | $Na^+$ |
| Compound 6 | Octyl group | Saturated C8 | 18 | $Na^+$ |
| Compound 7 | Oleyl group | Unsaturated C18 | 23 | $Na^+$ |
| Compound 8 | Lauryl group | Saturated C12 | 3 | $Na^+$ |

Example 1

Using Compound 1 obtained in Synthesis Example 1 as an emulsifier, the emulsion polymerization was performed by the following method.

In a 1-liter three-necked flask equipped with an agitator and a raw material input port, 112.5 g of ion-exchange water, 0.36 g of potassium persulfate as a polymerization initiator, and 1.80 g of Compound 1 were mixed, to which was then dropped a monomer mixture of 109.7 g of butyl acrylate, 109.7 g of styrene, and 5.6 g of acrylic acid over about 5 minutes while agitating at a rate of 500 r/min, and the contents were agitated for 30 minutes, thereby obtaining an emulsion dropping solution.

Subsequently, in a 1-liter separable flask equipped with an agitator, a reflux condenser, and a raw material input port, 162.5 g of ion-exchange water, 0.09 g of potassium persulfate as a polymerization initiator, 0.45 g of Compound 1, and 17.1 g (corresponding to 5% by mass) of the aforementioned emulsion dropping solution were charged, the temperature was raised to 80° C., and first-stage polymerization was performed for 30 minutes. Thereafter, the remaining emulsion dropping solution was dropped over 3 hours, and after completion of dropping, the contents were further aged at 80° C. for 1 hour. The resulting polymer emulsion was cooled to 30° C.

Examples 2 to 4 and Comparative Examples 1 to 3

Using each of Compounds 2 to 8 obtained in Synthesis Examples 2 to 8 as an emulsifier, the emulsion polymerization was performed in the same manner as in Example 1.

In Comparative Example 1, a mixture of Compound 5 and Compound 6 (Compound 5/Compound 6=84% by mass/16% by mass) was used.

<Performance Evaluations>

Using the polymer emulsion obtained in each of Examples 1 to 4 and Comparative Examples 1 to 3, an average particle diameter and water resistance of the polymer coating film were evaluated. A melting point of each of the compounds used and results are shown in Table 2.

(1) Melting Point of Compound

Using a high sensitivity differential scanning calorimeter (a trade name: DSC7000X, manufactured by Hitachi High-Tech Science Corporation), each compound was put into a 70-μL pan, the temperature was raised from −5° C. to 80° C. at a rate of 1° C./min, and a temperature at the time of a maximum peak of a temperature difference to be detected with a differential thermocouple relative to the temperature rise time was defined as a melting point.

(2) Average Particle Diameter of Polymer Emulsion

Using a particle size & molecular weight analyzer (a trade name: ELSZ-1000ZS, manufactured by Otsuka Electronics Co., Ltd.), polymer emulsion particles which had been neutralized with 25% by mass ammonia water were diluted thirty thousand times and measured for an average particle diameter. As for the measurement analysis method, a cumulant average particle diameter obtained by undergoing cumulative measurement 70 times was adopted.

(3) Water Resistance of Polymer Coating Film

Using a Baker type film applicator No. 510 (0 to 50 mil) (manufactured by Yasuda Seiki Seisakusho, Ltd.), the polymer emulsion which had been neutralized with 25% by mass ammonia water was applied on a transparent acrylic resin plate such that a dry film thickness was 50 μm, and then dried at 100° C. for 10 minutes by using an air-forced oven (a trade name: SPS-222, manufactured by ESPEC Corp.).

This acrylic resin plate was dipped in water at 23° C. for 20 days, and a haze value of the polymer coating film was then measured using a haze-transmittance meter (a trade name: HM-150, manufactured by Murakami Color Research Laboratory Co., Ltd.). The smaller the haze value, the more favorable the water resistance, and it is judged that in the case where the haze value is 3% or less, the water resistance is especially favorable.

TABLE 2

| | Compound | | | Average particle | Water |
| --- | --- | --- | --- | --- | --- |
| | Kind | Melting point (° C.) | Content (mass %) | diameter (nm) | resistance (Haze value, %) |
| Example 1 | Compound 1 | 60 | 100 | 130 | 1.3 |
| Example 2 | Compound 2 | 24 | 100 | 142 | 2.1 |
| Example 3 | Compound 3 | 34 | 100 | 145 | 2.4 |
| Example 4 | Compound 4 | 42 | 100 | 140 | 4.0 |
| Comparative Example 1 | Compound 5 Compound 6 | <0 | 84 16 | 150 | 13.0 |
| Comparative Example 2 | Compound 7 | <0 | 100 | 169 | 24.0 |
| Comparative Example 3 | Compound 8 | <0 | 100 | 138 | 50.0 |

It is noted from Table 2 that the melting point of each of Compounds 1 to 4 used in Examples 1 to 4 is high as 20° C. or higher; the average particle diameter of each of the polymer emulsions used in Examples 1 to 4 is smaller than the average particle diameter of each of the polymer emulsions used in Comparative Examples 1 to 3; and as a result, the polymer coating films of Examples 1 to 4 are excellent with respect to the water resistance as compared with the polymer coating films of Comparative Examples 1 to 3.

The invention claimed is:

1. A method of producing a polymer emulsion for water-resistant coating films, comprising emulsion polymerizing a radical polymerizable monomer (B) in the presence of a compound (A) represented by the following formula (1):

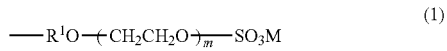

$$\mathrm{—R^1O{-\!\!\!\!-}(CH_2CH_2O{-\!\!\!\!-})_{\overline{m}}{-\!\!\!\!-}SO_3M} \qquad (1)$$

wherein $R^1$ represents a linear alkyl group having 18 or more and 22 or less carbon atoms; m represents an average addition molar number of $(CH_2CH_2O)$ and is 1 or more and 8 or less; and M represents a cation or a hydrogen atom, the radical polymerizable monomer (B) is at least one monomer selected from the group consisting of an aromatic vinyl monomer, a (meth)acrylic acid and a (meth)acrylic acid ester, a melting point of the compound (A) is 20° C. or higher and 80° C. or lower, and an average particle diameter of the polymer emulsion is 130 nm or more and 160 nm or less.

2. The method of producing a polymer emulsion for water-resistant coating films according to claim 1, wherein m in the formula (1) is 2 or more and 7 or less.

3. The method of producing a polymer emulsion for water-resistant coating films according to claim 1, wherein the use amount of the radical polymerizable monomer (B) is 30% by mass or more and 70% by mass or less, relative to the entire system.

4. The method of producing a polymer emulsion for water-resistant coating films according to claim 1, wherein the use amount of the compound (A) is 20% by mass or more and 100% by mass or less, relative to the total amount of the emulsifier.

5. The method of producing a polymer emulsion for water-resistant coating films according to claim 1, wherein the use amount of the compound (A) is 0.1 parts by mass or more and 10 parts by mass or less, based on 100 parts by mass of the monomer (B).

6. The method of producing a polymer emulsion for water-resistant coating films according to claim 1, wherein a viscosity of the polymer emulsion is 10 mPa·s or more and 50,000 mPa·s or less.

* * * * *